Sept. 23, 1930.  H. E. ALTGELT  1,776,242
MOTOR CULTIVATOR ATTACHMENT
Filed June 17, 1927  3 Sheets-Sheet 1
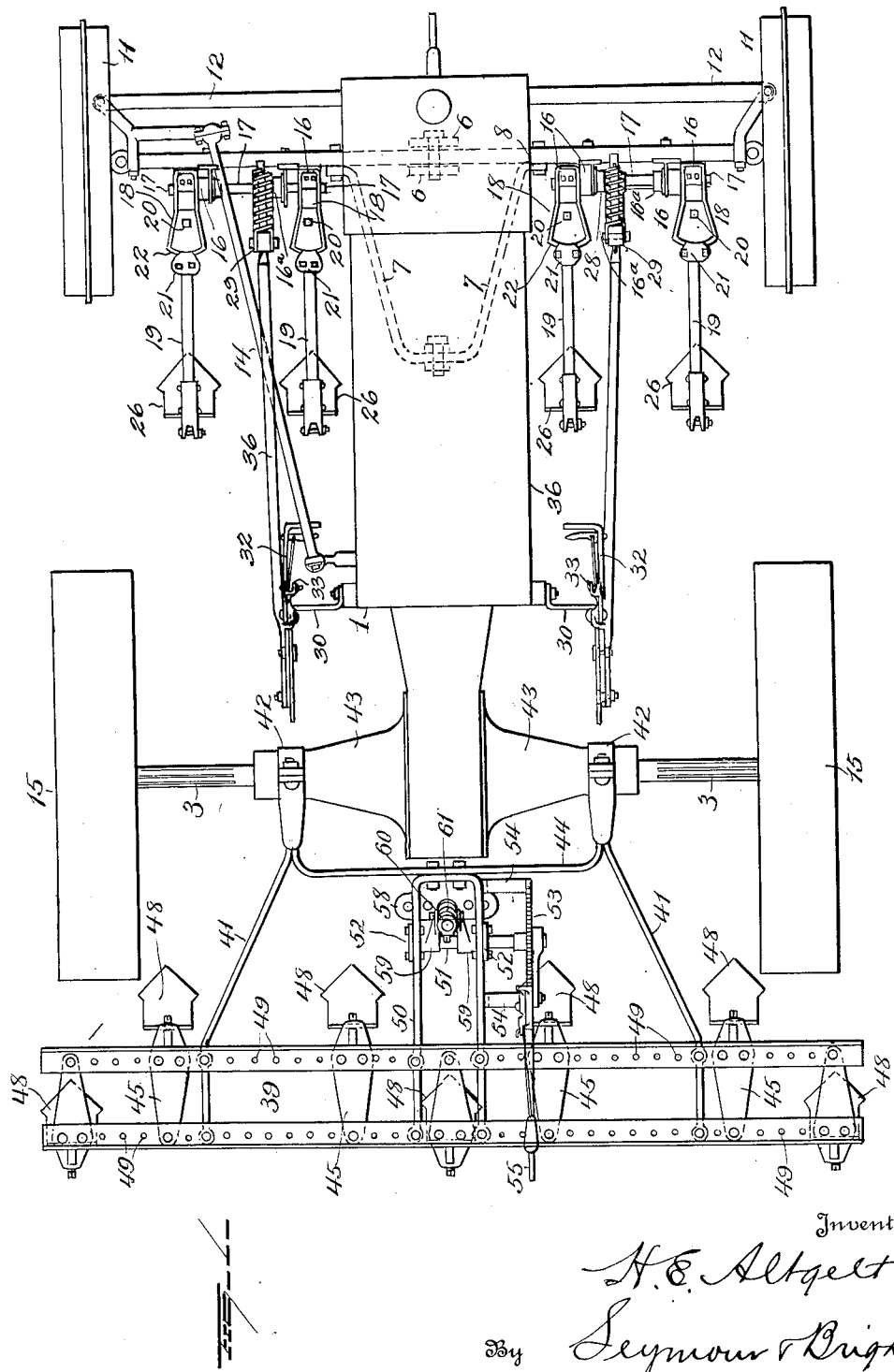

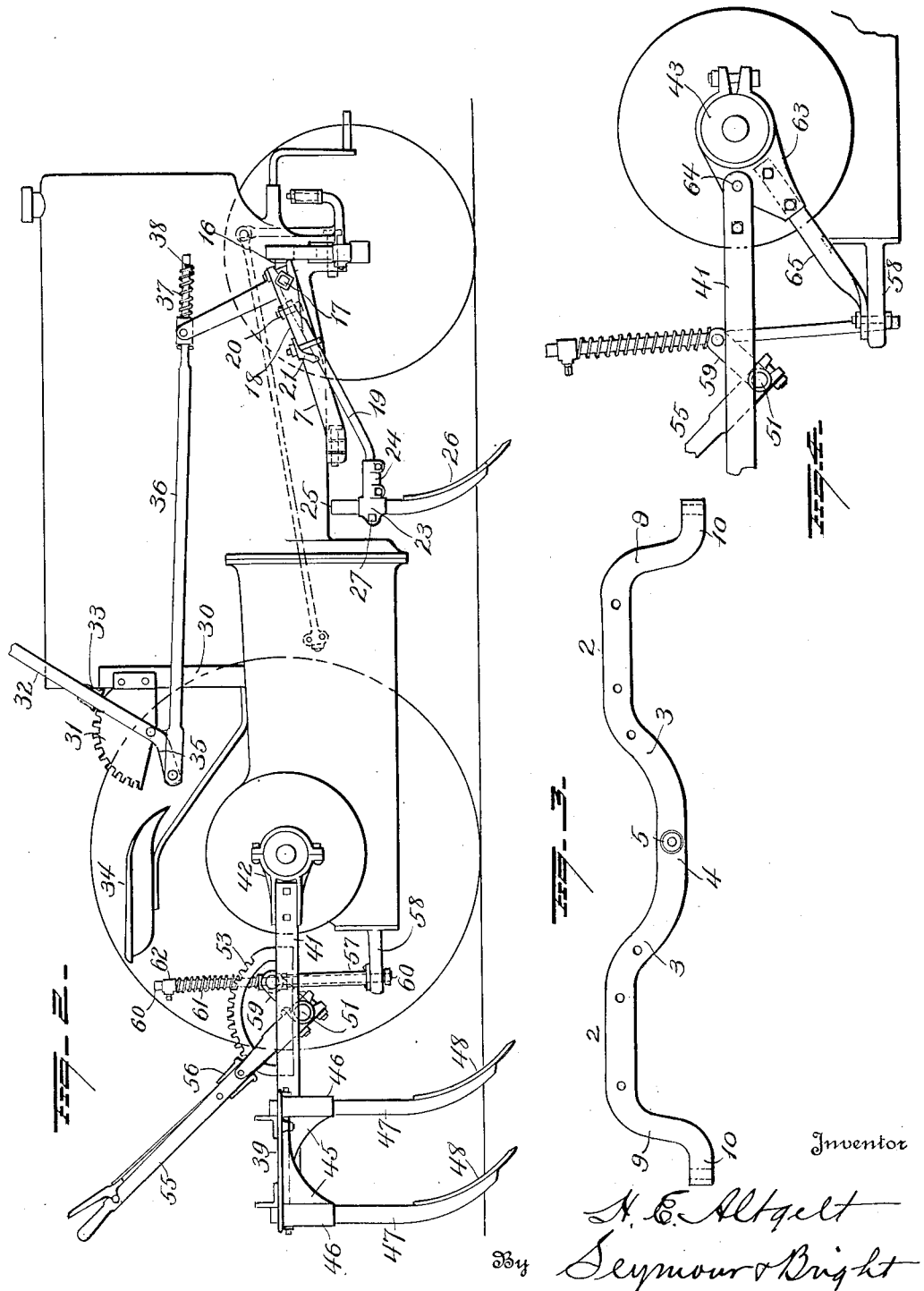

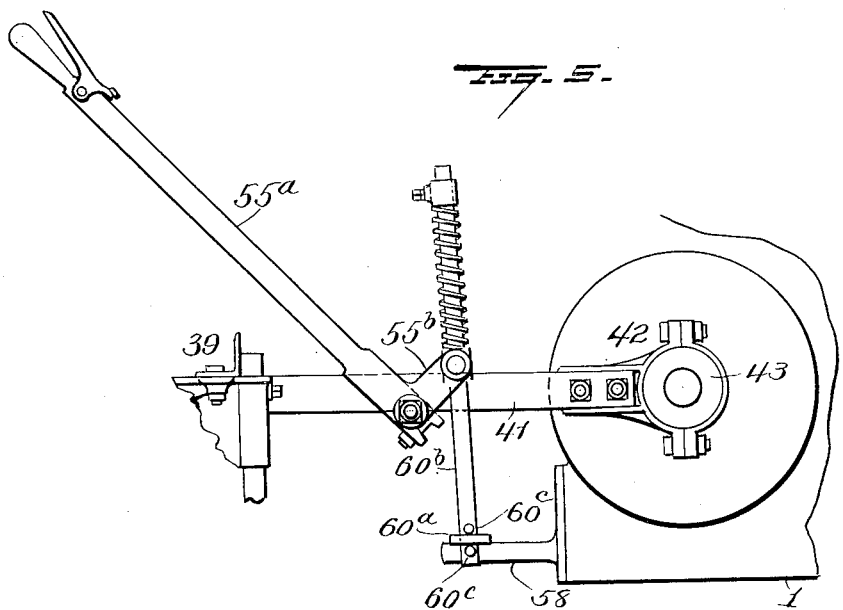
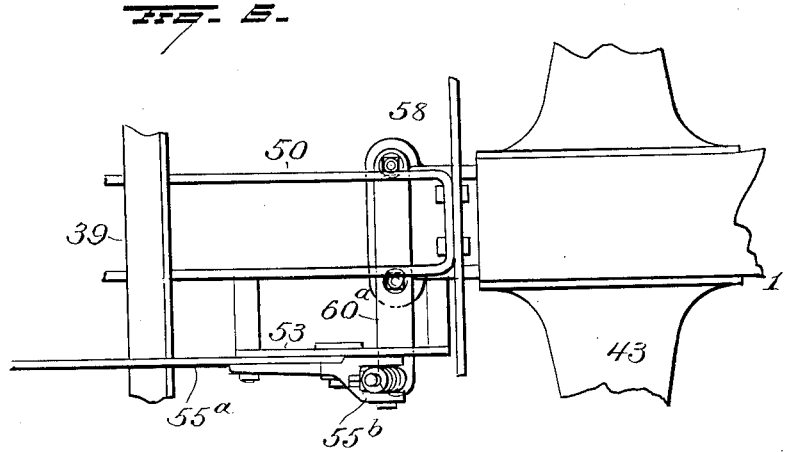

Patented Sept. 23, 1930

1,776,242

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

MOTOR CULTIVATOR ATTACHMENT

Application filed June 17, 1927. Serial No. 199,535.

This invention relates to improvements in agricultural implements and more particularly to motor driven implements,—one object of the invention being to provide attachments which shall be applicable to a tractor, particularly of the Fordson type and embody soil-engaging elements located rearwardly of the front axle and forwardly of the rear axle, and which shall also embody soil engaging elements located rearwardly of the rear axle of the tractor.

A further object is to provide simple and efficient means for connecting beams of soil engaging elements with the forward portion of the tractor structure.

A further object is to provide forward and rear cultivator structures attachable to the forward portion of a tractor, a rear cultivator structure to be located rearwardly of the rear axle of the tractor, means for raising and lowering the beams of the forward cultivator structures, and separate means for raising and lowering the rear cultivator structure.

A further object is to improve in various details, motor cultivators of the type to which the invention relates and to provide such a cultivator which shall be substantial and capable of effectually performing the functions required of it.

With these and other objects in view, the invention consists in certain novel features of construction and combinations of parts as hereinafter set forth and pointed out in the claims.

In the accompanying drawings;

Figure 1 is a plan view of a motor cultivator embodying my improvements;

Figure 2 is a view in side elevation;
Figure 3 is a separate view of the front axle of the tractor, and Figures 4, 5 and 6 are views illustrating modifications.

A tractor of the Fordson type is indicated at 1, the front axle at 2 and the rear axle 3. In order that the wheels of the tractor shall be sufficiently spaced apart to permit the cultivation of two rows of corn by means of the cultivating elements located as hereinafter described, said front and rear axles are made of greater length than the normal front and rear axles of a Fordson tractor. The front axle 2 is made with a downwardly bowed central portion 4 which is pivotally connected at its center (indicated at 5) with arms 6 near the forward end of the tractor. A reach 7 is connected at its central portion with the tractor body and the respective members of this reach are connected at 8 with the front axle. The respective ends of the front axle are bent downwardly as at 9 and then outwardly as at 10,— the portions 10 serving to receive the mountings of the front steering wheels 11, 11. Portions of the steering gear for said wheels are shown at 12, 13 and 14, but as the particular construction of the steering gear forms no part of my present invention, further description of the same herein is deemed unnecessary. The rear axle end portions are made sufficiently long to accommodate tractor wheels 15 spaced approximately the same distance apart as are the front wheels 11. The outwardly projecting rear axle portions may be grooved or made angular in cross section and the rear traction wheels may be moved inwardly or outwardly thereon so that they may be adjusted to different spaced positions and then secured in any suitable manner to the hubs of the traction wheels.

Brackets 16 are secured to the front axle at respective sides of the tractor body and project rearwardly from said axle. The brackets 16 of the respective pairs receive bearings 16ª for rocker shafts 17, which latter are preferably made angular in cross section and one of said shafts is located at each side of the forward portion of the tractor. To each of the shafts 17, a plurality or gang of beam brackets 18 are secured, (preferably by clamping) and each bracket 18 is made to flare somewhat rearwardly. The forward end of a cultivator beam 19 is attached, between the ends of each bracket 18, by means of a bolt 20 and each beam is normally held against lateral displacement by a clamp 21 which engages the beam and the segmental rear end 22 of the bracket. A split sleeve 23 is secured, through the medium of a clamp 24 integral therewith, to the rear end of each beam 19 and the standard 25 of a cultivator shovel 26 passes through the sleeve 23, a bolt 27 being employed to clamp the standard in the sleeve.

It will be observed that the cultivator units are normally parallel with each other and with the tractor body at respective sides of the latter and that the said units are located between the front and rear axles of the tractor.

By connecting the cultivator beams with the beam brackets 18 and the shovel standards to the beams, as above described, said beams may be so adjusted laterally as to accurately space the cultivator shovels relative to the rows of corn. This may be accomplished by first loosening the bolts 20 and the clamps 21. This will permit the beams 19 to be swung laterally on the bolts 20. The bolts 20 and clamps 21 may then be tightened. The clamping sleeves 23 may now be loosened and the standards 25 turned to bring the shovels to proper positions parallel with each other and with the line of draft,—after which the bolts 27 of the clamping sleeves will be again tightened.

To each of the shafts 17, an arm 28 is secured and projects upwardly therefrom. A sleeve 29 is pivotally connected with the upper end of each arm 28. Brackets 30 are secured to rear portion of the tractor body and project laterally from the latter. Toothed segments 31 are secured to the brackets 30, and to each of said segments, a hand lever 32 is pivotally connected near its lower end and carries a suitable detent 33 for cooperation with the toothed segment 31. The levers 32 are thus arranged at respective sides of the tractor body within convenient reach of an operator occupying the driver's seat 34 on the tractor. The lower arms 35 of the hand levers 32 may project rearwardly and downwardly and have pivotally connected therewith, the rear ends of connecting rods 36. The front portions of these rods may be contracted somewhat in size and pass freely through and forwardly beyond the sleeves 29 at the upper ends of the arms 28. Springs 37 are located on the forwardly projecting end portions of the rods 36 and bear at their ends respectively against the sleeves 29 and pins or abutments 38 near the free forward ends of said rods 36.

By manipulating the hand levers 32, the cultivator gangs may be raised or lowered and they may be adjusted for depth of penetration of the shovels. The springs 37 operate to apply yielding pressure to the cultivator gangs.

Rearwardly of the tractor, a transversely disposed frame 39 is located, the length of said frame being such that it will extend slightly beyond the horizontal planes of the outer faces of the rear traction wheels 15 and comprises parallel angle beams 40 suitably spaced apart. The rear frame 39 is connected with the rear portion of the tractor through the medium of supporting members 41 secured at their rear ends to the respective parallel beams 40 of said rear frame and secured at their forward ends to bearings 42 loosely mounted on the rear axle housing 43 near respective ends of the latter. The supporting members are connected by a brace bar 44 located behind the axle housing 43. The beams 40 of the rear frame 39 are connected by horizontal brackets 45 and these brackets project beyond one beam 40 or the other. The projecting portions of the brackets 45 are so formed as to provide sleeves 46 for the accommodation of the shanks 47 of cultivator shovels 48 or other soil engaging members. The beams 40 of the rear frame 39 are provided each with numerous perforations 49 for accommodation of the bolts which secure the brackets to the rear frame, so that said brackets and therefore the rear soil engaging members may be adjusted relatively to each other. The arrangement of the rear shovels will be such however, that they will not be in line with the front shovels, and at least one rear shovel will be behind each of the traction wheels 15, while one of the rear shovels will occupy a position in line with the longitudinal axis of the tractor.

The parallel members of a horizontally disposed U-shaped bracket 50 are secured at their rear ends to central portions of the rear frame members 40 and at its forward end, said bracket is secured to the brace 44 in rear of central portion of the rear axle housing of the tractor. A shaft 51 extends across the parallel members of the U-shaped bracket 50 and projects laterally beyond one of said members,—suitable bearings 52 being provided on said members for said shaft. A toothed segment 53 is disposed laterally from the bracket 50 and connected with the latter by arms 54, and a hand lever 55 secured to the projecting end of the shaft 51 carries a suitable detent at 56 for cooperation of said segment. A vertically disposed tube 57 is secured to the draw-bar cap 58 at the rear end of the tractor and communicates with a hole in the latter and the upper end portion of said tube is pivotally connected with arms 59 projecting from the shaft 51. A rod or bar 60 extends through the vertical tube 57 and the draw bar cap 58 and is headed at its lower end under the latter. This rod or bar extends upwardly beyond the tube and receives a spring 61, the latter bearing at its respective ends against the upper end of the tube 57 and a collar or abutment 62 adjustably secured to the upper portion of said rod or bar.

When the hand lever 55 is moved forwardly from the position shown in Figure 2, a downward pressure will be applied, through the medium of the tube 57 to the draw-bar cap of the tractor and the rear cultivator frame 39 will be raised, to either raise the rear cultivator elements out of the ground or to adjust them to regulate their depth of penetration. It will be apparent that when the hand lever 55 is moved to cause the raising or lowering of the rear cultivator frame, said frame will swing on its connection with the rear axle housing of the tractor.

In the construction of lifting mechanism for raising and lowering the rear shovel frame, shown in Figures 5 and 6, a horizontal bar 60ª is secured to the draw-bar cap or clevis 58 and projects laterally beyond the same in one direction. The sleeve 57 hereinbefore described is dispensed with and the rod 60ᵇ is passed through the free end portion of said horizontal bar, pins 60ᶜ being passed transversely through said rod over and under said bar. In this construction the hand lever 55ª is provided with a bifurcated arm 55ᵇ pivotally connected with an enlargement 55ᶜ on the rod 60ᵇ, the spring 61ª on said rod bearing at one end against said enlargement and at the other end against an abutment 62ª.

Instead of connecting the supporting members for the rear cultivator frame, with the use of bearing members loosely mounted on the rear axle housing as previously explained, brackets 63 may be clamped to said housing near respective ends thereof and the support members 41 pivotally connected thereto, as at 64 Figure 4, each of said brackets being connected with the draw-bar cap of the tractor through the medium of a brace 65.

Having fully described my invention what I claim as new and desire to secure by Letters-Patent, is:—

1. In tillage attachments for tractors, the combination with arched front axle, two rock shafts, means attachable to the arched portions of said front axle for supporting said shafts on the rear side of the axle at respective sides of the body of the tractor, soil engaging units, and means for connecting said units with each of said shafts.

2. In tillage attachments for tractors, the combination with brackets to be secured to and project rearwardly from the front axle of the tractor at both sides of the tractor body, of shafts supported by said brackets, beam brackets secured to each of said shafts, and beams of soil engaging elements secured to said beam brackets.

3. The combination with the front axle and wheels of a tractor, of brackets secured to said front axle and projecting rearwardly therefrom at each side of the tractor body, shafts mounted in said brackets and disposed rearwardly thereof and between the tractor body and the respective front wheels, brackets secured to and projecting rearwardly from each of said shafts, soil-engaging elements, and beams connecting said soil-engaging elements with said last-mentioned brackets.

4. The combination with the front axle and wheels of a tractor, of brackets secured to said front axle and projecting rearwardly therefrom at each side of the tractor body, shafts mounted in said brackets and disposed rearwardly thereof and between the tractor body and the respective front wheels, brackets secured to and projecting rearwardly from each of said shafts, soil-engaging elements, beams connecting said soil-engaging elements with said last-mentioned brackets, and means whereby said beams may be adjusted to adjust the spacing of the soil-engaging elements.

5. The combination with the front axle and wheels of a tractor, of brackets secured to said front axle and projecting rearwardly therefrom at each side of the tractor body, shafts mounted in said brackets and disposed rearwardly thereof and between the tractor body and the respective front wheels, brackets secured to and projecting rearwardly from each of said shafts, soil-engaging elements, beams connecting said soil-engaging elements with said last-mentioned brackets, means pivotally connecting the beams with said brackets whereby the beams may be adjusted laterally, and means for securing beams in adjusted position.

6. The combination with the body and front axle of a tractor, of shafts located rearwardly of and supported by the front axle at respective sides of the tractor body, a plurality of brackets secured to and projecting rearwardly from each of said shafts, a beam connected with each of said brackets, soil engaging means carried by each of said beams, an arm secured to each of said shafts, a hand lever at each side of the tractor body and supported by the latter, and rods connecting the hand levers with the arms on said shafts.

7. The combination with the body and front axle of a tractor, of shafts located rearwardly of and supported by the front axle at respective sides of the tractor body, a plurality of brackets secured to and projecting rearwardly from each of said shafts, a beam connected with each of said brackets, soil-engaging means carried by each of said beams, an arm secured to each of said shafts, a hand lever at each side of the tractor body and supported by the latter, rods connecting the hand levers with the arms on said shafts, sleeves pivotally connected with said arms and said rods passing freely through said sleeves, abutments near the forward ends of said rods, and springs on said rods between said abutments and said sleeves.

8. In a tillage attachment for tractors, the combination with brackets to be secured to and project rearwardly from the front axle of the tractor, of a shaft supported by said brackets, beam brackets secured to said shaft, and beams of soil-engaging elements secured to said beam brackets.

9. In a tillage attachment for tractors, the combination with brackets to be secured to and project rearwardly from the front axle of the tractor, of a shaft supported by said brackets, beam brackets secured to said shaft, beams of soil-engaging elements secured to said beam brackets, and means whereby the beams may be adjusted to adjust the spacing of the soil-engaging elements.

10. In a tillage attachment for tractors, the combination with brackets to be secured to and project rearwardly from the front axle of the tractor, of a shaft supported by said brackets, beam brackets attached to and projecting rearwardly from said shaft, soil-engaging elements, beams between said soil-engaging elements and said last-mentioned brackets, means pivotally connecting the beams with said brackets whereby the beams may be adjusted laterally, and means for securing the beams in adjusted position.

11. In a tillage attachment for tractors, the combination with brackets to be secured to and project rearwardly from the front axle of the tractor, of a shaft supported by said brackets, beam brackets secured to said shaft, beams of soil-engaging elements secured to said beam brackets, an arm secured to said shaft, a muscularly operated lever, and a connection between said lever and said arm.

In testimony whereof, I have signed this specification.

HERMAN E. ALTGELT.